US011321479B2

(12) United States Patent
Raphael et al.

(10) Patent No.: US 11,321,479 B2
(45) Date of Patent: May 3, 2022

(54) DYNAMIC ENFORCEMENT OF DATA PROTECTION POLICIES FOR ARBITRARY TABULAR DATA ACCESS TO A CORPUS OF RECTANGULAR DATA SETS

(71) Applicant: International Business Machines Corporation, Armonk, NY (US)

(72) Inventors: Roger C. Raphael, San Jose, CA (US); Ety Khaitzin, Petach-Tikva (IL); Scott Schumacher, Porter Ranch, CA (US); Arjun Natarajan, Old Tappan, NJ (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 16/705,885

(22) Filed: Dec. 6, 2019

(65) Prior Publication Data
US 2021/0173952 A1    Jun. 10, 2021

(51) Int. Cl.
G06F 21/00    (2013.01)
G06F 21/62    (2013.01)
G06F 16/22    (2019.01)

(52) U.S. Cl.
CPC ........ G06F 21/6218 (2013.01); G06F 16/221 (2019.01); G06F 16/2255 (2019.01)

(58) Field of Classification Search
CPC . G06F 21/6218; G06F 16/221; G06F 16/2255
See application file for complete search history.

(56) References Cited

U.S. PATENT DOCUMENTS 6,289,344 B1 * 9/2001 Braia ................. G06F 21/6218
                                                707/999.009
7,324,514 B1 * 1/2008 Haq ....................... H04L 12/66
                                                370/395.32
10,778,721 B1 * 9/2020 Holbrook ............ G06F 16/9017
(Continued)

OTHER PUBLICATIONS

Schuler et al., "Digital Asset Management For Heterogeneous Biomedical Data in an Era of Data-Intensive Science," 2014 IEEE International Conference on Bioinformatics and Biomedicine (BIBM), Dec. 2014, 8 pages.
(Continued)

Primary Examiner — Shin-Hon (Eric) Chen
(74) Attorney, Agent, or Firm — Yee & Associates, P.C.

(57) ABSTRACT

Enforcement of policies for tabular data access as a collection of columns over a plurality of different information assets is provided. In an enforcement knowledge graph, information asset-assigned terms are found that correspond to information assets in a virtual information asset that references a set of tabular data. Transitive closures of the information asset-assigned terms are found in a business glossary to form a table of business glossary terms. Term intersection is determined between a hash table of any column-assigned terms and the table of business glossary terms. The information assets are assigned to the virtual information asset when the term intersection is not empty. A set of policy rules associated with the set of tabular data and a context of a user making a data access request to the set of tabular data is applied to the virtual information asset to determine an access enforcement decision.

20 Claims, 11 Drawing Sheets

(56) References Cited

U.S. PATENT DOCUMENTS

| | | | | |
|---|---|---|---|---|
| 2005/0262132 | A1* | 11/2005 | Morita | G06F 21/6218 |
| | | | | 707/999.102 |
| 2010/0262625 | A1* | 10/2010 | Pittenger | G06F 21/6227 |
| | | | | 707/783 |
| 2015/0074075 | A1* | 3/2015 | Alexander | G06Q 30/02 |
| | | | | 707/706 |
| 2018/0060365 | A1* | 3/2018 | Mujumdar | G06F 21/6227 |
| 2018/0341839 | A1* | 11/2018 | Malak | G06V 30/2272 |
| 2018/0342007 | A1* | 11/2018 | Brannigan | G06Q 30/0643 |
| 2019/0311149 | A1* | 10/2019 | Margel | G06F 21/6218 |
| 2021/0081557 | A1* | 3/2021 | Thomson-Wood | |
| | | | | G06F 21/6218 |

OTHER PUBLICATIONS

Corwin et al., "Dynamic Tables: An Architecture for Managing Evolving, Heterogeneous Biomedical Data in Relational Database Management Systems," Journal of the American Medical Informatics Association, vol. 14, No. 1, Jan./Feb. 2007, 8 pages.

Tuecke et al., "Globus Auth: A Research Identity and Access Management Platform," 2016 IEEE 12th International Conference on e-Science (e-Science), 2016, 10 pages.

Miloslavskaya et al., "Big Data, Fast Data and Data Lake Concepts," 7th Annual International Conference on Biologically Inspired Cognitive Architectures, BICA 2016, Procedia Computer Science, vol. 88, pp. 300-305.

* cited by examiner

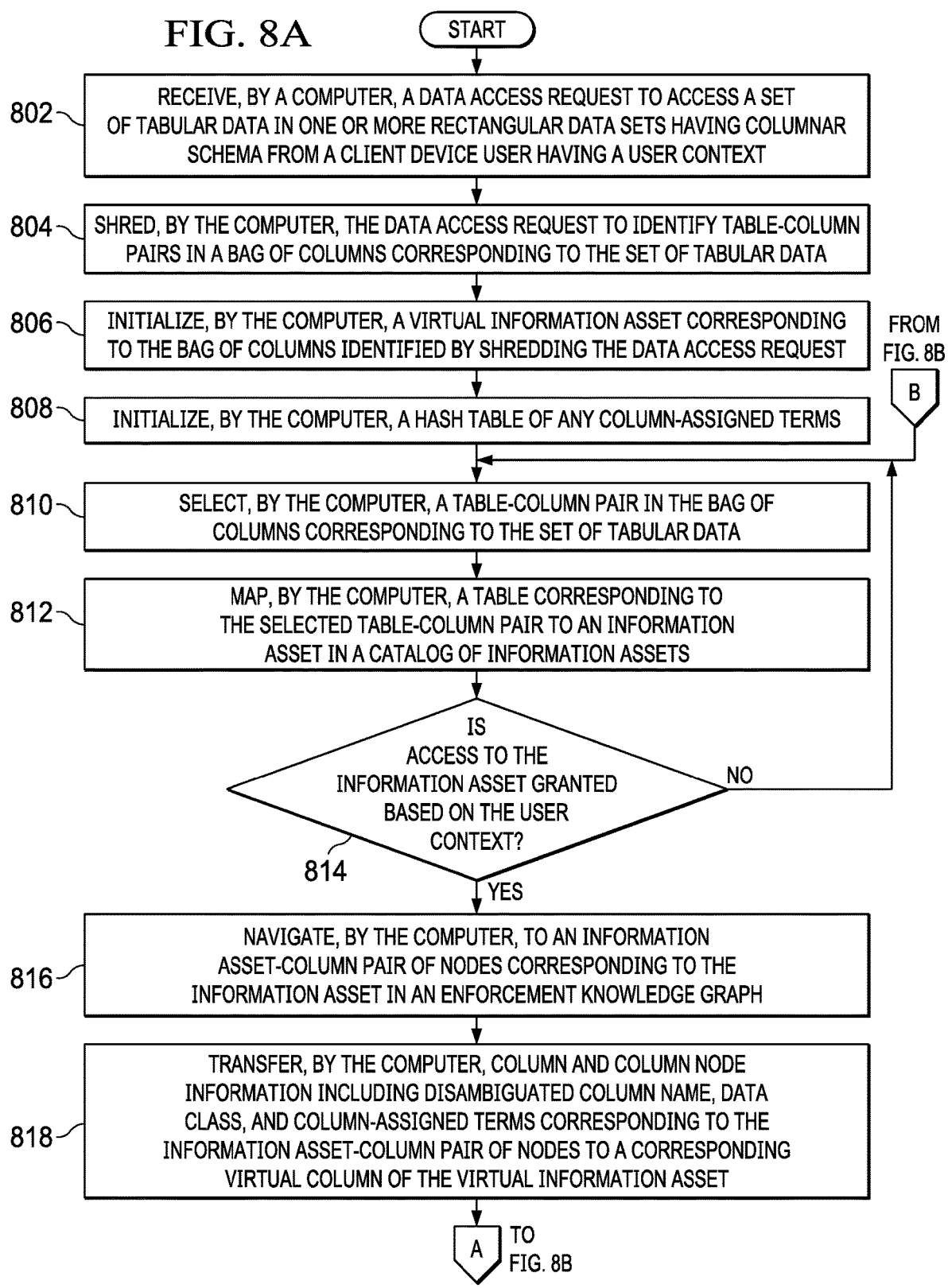

DYNAMIC ENFORCEMENT OF DATA PROTECTION POLICIES FOR ARBITRARY TABULAR DATA ACCESS TO A CORPUS OF RECTANGULAR DATA SETS

BACKGROUND

1. Field

The disclosure relates generally to data security and more specifically to dynamically enforcing data protection policies for arbitrary tabular data access as a collection of columns over a plurality of different information assets having different columnar schema.

2. Description of the Related Art

Data security means protecting digital data, such as, for example, tabular data. sets that are rectangular in structure incorporating columns and rows as in a relational database, from unauthorized access. Data security typically involves preventing or at least reducing the probability of unauthorized or inappropriate access, although it may also involve reducing the adverse impacts of security incidents as well. A primary focus of data security is balanced protection of confidentiality, integrity, and availability of data, while maintaining policy enforcement without hampering organization productivity.

In general, access control includes user authentication and authorization. A narrow definition of access control covers only access approval, whereby a computer system determines whether to grant or reject an access request from an already authenticated user based on what data the user is authorized to access.

A computer system for an organization may have a multitude of policies for protecting data by restricting access to the data. These policies can be based on organizational guidelines, security standards, privacy laws, government regulations, or other sources. By enforcing these policies, a computer system protects the organization's data by governing who can access what data, when, and from where. In other words, before access to any data asset, the computer system checks the policy rules to determine a data access enforcement decision as to whether to allow or deny access to a particular data asset.

SUMMARY

According to one illustrative embodiment, a computer-implemented method for dynamic enforcement of data protection policies for arbitrary tabular data access as a collection of columns over a plurality of different information assets having different columnar schema is provided. A computer finds, in an enforcement knowledge graph, information asset-assigned terms corresponding to each unique information asset in a virtual information asset that references a set of tabular data in one or more rectangular data sets having columnar schema. The computer adds the information asset-assigned terms to a hash table of information asset-assigned terms. The computer finds transitive closure of the information asset-assigned terms in a hierarchical business glossary of terms to form a table of business glossary terms corresponding to each information asset-assigned term. The computer determines term intersection between a hash table of any column-assigned terms and the table of business glossary terms. The computer assigns the information asset-assigned terms to the virtual information asset in response to determining that the term intersection is not empty. The computer applies a set of access enforcement policy rules associated with the set of tabular data and a particular user context of a client device user making a data access request to the set of tabular data to the virtual information asset containing column and information asset term information to determine an access enforcement decision corresponding to the data access request. According to other illustrative embodiments, a computer system and computer program product for dynamic enforcement of data protection policies for arbitrary tabular data access as a collection of columns over a plurality of different information assets having different columnar schema are provided.

BRIEF DESCRIPTION OF THE DRAWINGS

FIGS. 8A-8D are a flowchart illustrating a process for dynamic enforcement of data protection policies for arbitrary tabular data access in accordance with an illustrative embodiment.

DETAILED DESCRIPTION

Figure 1:
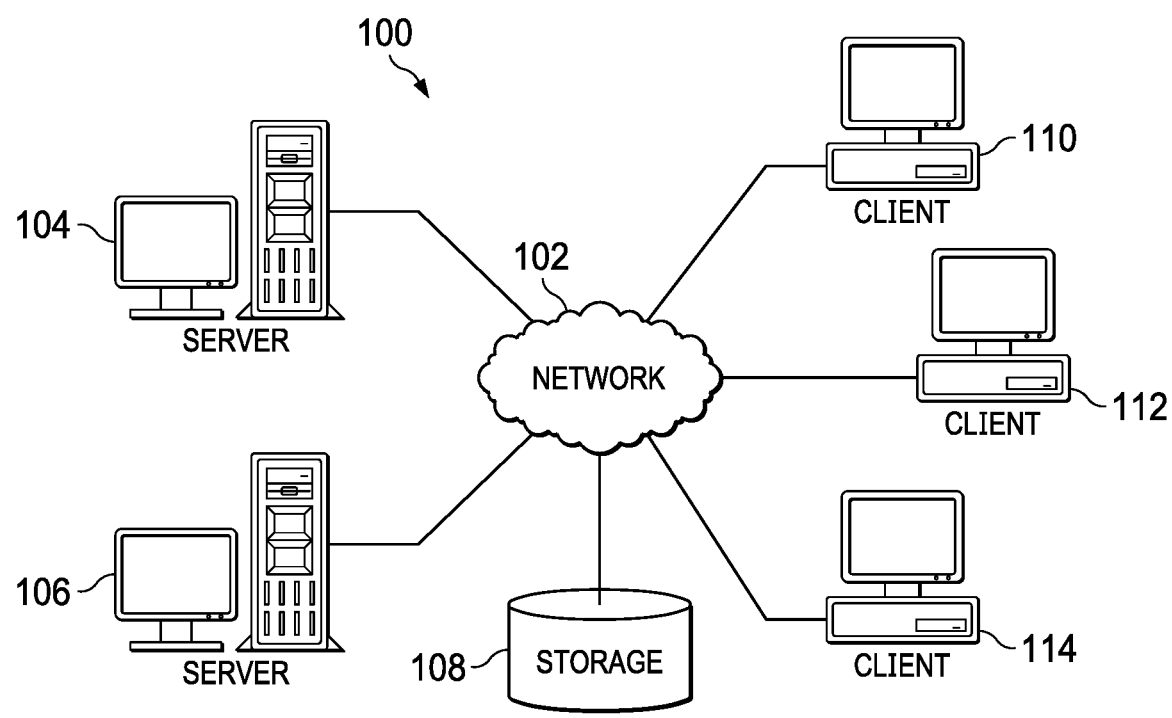
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
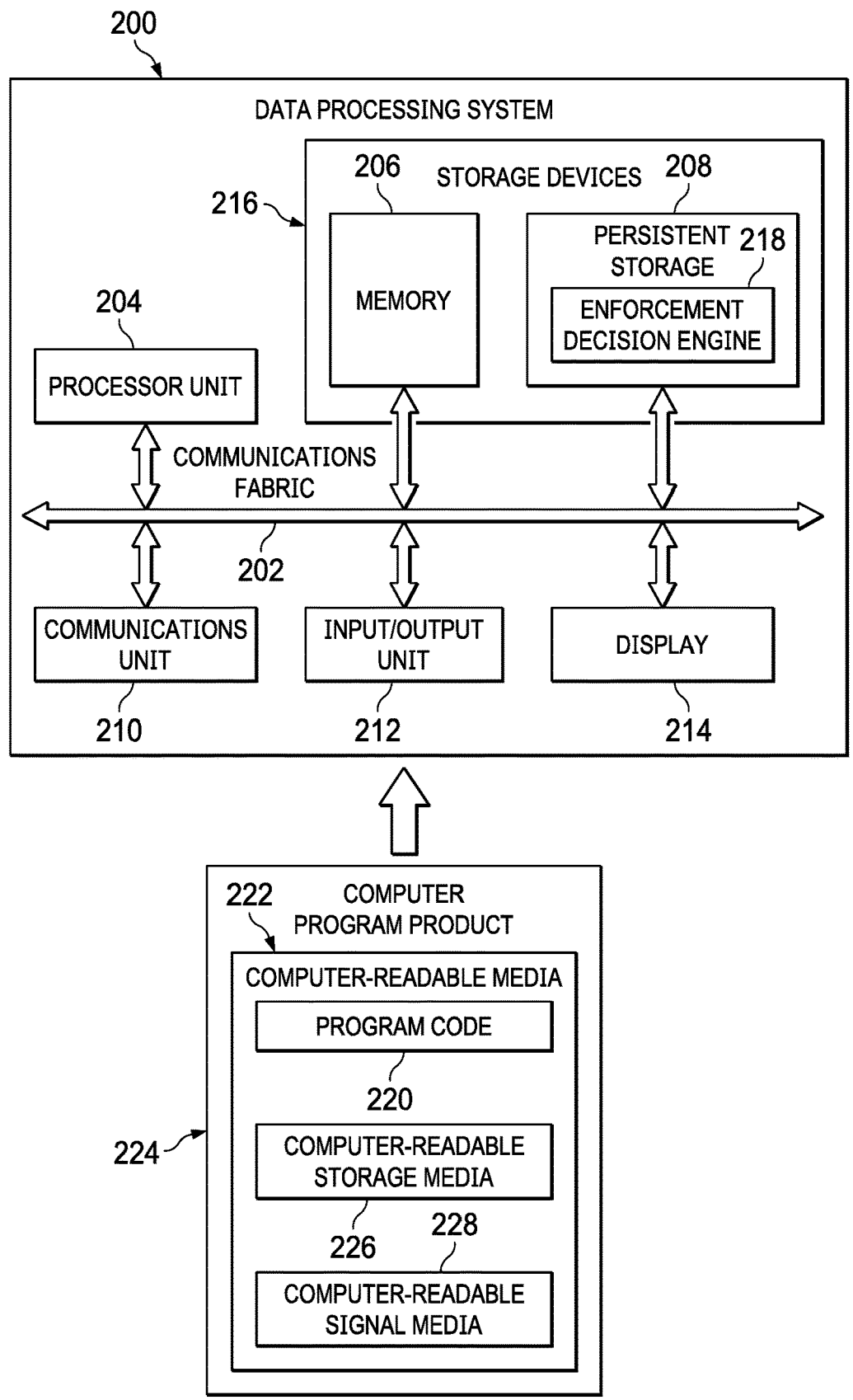
FIG. 2 is a diagram of a data processing system in which illustrative embodiments may be implemented.
Figure 3:
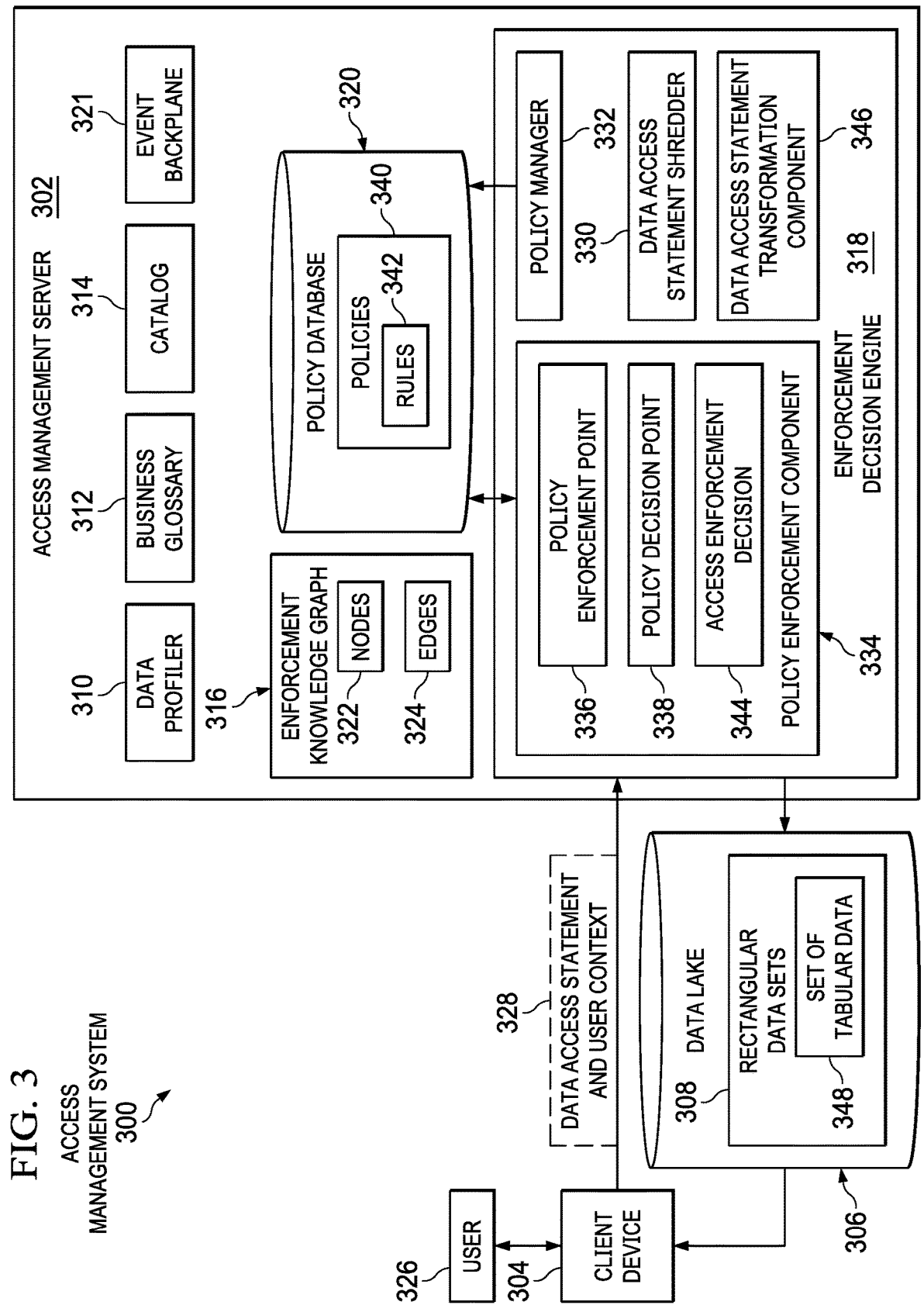
FIG. 3 is a diagram illustrating an example of an access management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide data security services for one or more sets of rectangular data stored in a data lake corresponding to an organization, such as, for example, a company, a business, an enterprise, an agency, an institution, or the like. For example, server 104 and server 106 provide dynamic enforcement of data protection policies for arbitrary tabular access to the one or more sets of rectangular data corresponding to the organization. Also, it should be noted that server 104 and server 106 may each represent a cluster of servers in one or more data centers. Alternatively, server 104 and server 106 may each represent multiple computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, smart phones, smart watches, smart televisions, and the like, with wire or wireless communication links to network 102. Users of clients 110, 112, and 114 may utilize clients 110, 112, and 114 to send data access requests, such as, for example, Structured Query Language (SQL) statements, to server 104 and server 106.

Storage 108 is a network storage device capable of storing any type of data in a structured format, such as, for example, a relational database. In addition, storage 108 may represent a plurality of network storage devices. Further, storage 108 may store the data lake corresponding to the organization, a catalog of information assets that reference different sets of tabular data in the data lake, a database of data protection policies, a business glossary of terms corresponding to a domain of the organization, and the like. Furthermore, storage 108 may store other types of data, such as user authentication or credential data that may include user names, passwords, and biometric data associated with client device users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores enforcement decision engine 218. However, it should be noted that even though enforcement decision engine 218 is illustrated as residing in persistent storage 208, in an alternative illustrative embodiment enforcement decision engine 218 may be a separate component of data processing system 200. For example, enforcement decision engine 218 may be a hardware component coupled to communication fabric 202 or a combination of hardware and software components. In another alternative illustrative embodiment, a first set of components of enforcement decision engine 218 may be located in data processing system 200 and a second set of components of enforcement decision engine 218 may be located in a second data processing system, such as, for example, server 106 in FIG. 1.

Enforcement decision engine 218 controls the process of dynamically enforcing data protection policies for arbitrary tabular data access to one or more rectangular data sets having columnar schema in a data lake corresponding to an organization to provide data security services for the rectangular data sets in response to receiving arbitrary data access requests from users. Enforcement decision engine 218 reasons over an enforcement knowledge graph to provide a data access decision for a policy enforcement request received from a policy enforcement point. Thus, data processing system 200 operates as a special purpose computer in which enforcement decision engine 218 in data processing system 200 enables dynamic enforcement of data protection policies for arbitrary tabular data access to rectangular data sets having columnar schema. In particular, enforcement decision engine 218 transforms data processing system 200 into a special purpose computer system as compared to currently available general computer systems that do not have enforcement decision engine 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200. In some instances, computer readable storage media 226 may not be removable from data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 220 may be downloaded over a network to persistent storage 208 from another device or data processing system through computer readable signal media 228 for use within data processing system 200. For instance, program code stored in a computer readable storage media in a data processing system may be downloaded over a network from the data processing system to data processing system 200. The data processing system providing program code 220 may be a server computer, a client computer, or some other device capable of storing and transmitting program code 220.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 226 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In data platforms and data lakes, data sets are typically stored in databases, files, and the like. A data lake is a storage repository that holds a vast amount of raw data in its native format until the data is needed. Typically, this data is rectangular in nature and stored as Hadoop Distributed File System (HDFS) files, real tables, spreadsheets, views, and other structures, such as JavaScript Object Notation (JSON) or the like. A key characteristic of this data is that it is rectangular in nature and for the most part consists of either static or dynamic columnar schema. The columnar schema stores data tables by column rather than by row.

Data platforms and data lakes protect this data using either role-based or policy-based access control. The more powerful mechanism is the policy-based control approach. A common enforcement model usually involves a metadata construct called an information asset that captures the attributes regarding the underlying data. As a result, the current state of enforcement is based on policy and centers around the notion of the information asset, which is a static representation of the data sets referenced by the information asset. However, this model of enforcement has an issue when dealing with dynamic access to the underlying data sets. For example, data can be accessed by Structured Query Language (SQL) or Java Database Connectivity (JDBC) that form arbitrary joins and projections of any number of underlying rectangular data sets of varying schemas, data clauses, and the like. Currently, no mechanism exists to address such a fuzzy model of enforcement, without enforcing the policies on each information asset separately and then combining them together. Consequently, the complexity increases to arrive at a policy enforcement decision tied to an arbitrary access to data from different data sets rather than static structures of the underlying data sets.

Increasingly, data virtualization technology is used for serving up data out of a data lake. This paradigm also imposes the same issue regarding arbitrary access over data sets via data manipulation standards, such as, for example, SQL, JDBC, and the like. In fact, in any data virtualization implementation, such as, for example, Universal Disk Format or the like, the number of indirections to real columns and relations could be arbitrarily deep and complex. This adds another layer of complexity that can only be solved by clearly tracking the relationships of virtual columns right down to real value generating columns of a real relation.

Illustrative embodiments address this arbitrary tabular access issue by using an enforcement knowledge graph, which captures deep data semantic (i.e., term) knowledge, column schema knowledge, historic user access pattern knowledge, and associated enforcement decision knowledge, corresponding to the underlying data sets. Arbitrary tabular access using an arbitrary SQL statement is defined as an arbitrary number of projections and joins of tabular data within the corpus of one or more rectangular data sets having columnar schema. In other words, the arbitrary SQL statement is selecting an arbitrary or random set of columns from the rectangular data. Illustrative embodiments may utilize SQL or other typical frameworks, such as Data Manipulation Language, where projections and joins can be inferred algorithmically. This approach utilized by illustrative embodiments is called a bag of columns enforcement model for rectangular data sets.

Illustrative embodiments continuously build the enforcement knowledge graph using a continuous data feed to populate the graph where information assets, column semantics (i.e., terms, also known as tags), column schema, column data classes, and historic enforcement decisions are recorded as nodes, edges, and hyperedges within the enforcement knowledge graph. This provides a continuous and consistent enforcement knowledge graph state relative to the policy enforcement component. The policy enforcement component consists of a policy enforcement point and a policy decision point based on the eXtensible Access Control Markup Language (XACML) model. XACML defines an attribute-based access control policy language and a processing model describing how to evaluate access requests according to rules defined in policies to determine whether a given user may access a requested set of data in a particular way (i.e., having a particular context). The policy decision point evaluates access requests against authorization policies before issuing access decisions. The policy enforcement point intercepts a user's access request to a set of data, makes a decision request to the policy decision point to obtain the access enforcement decision, and acts on the obtained access enforcement decision. For example, a user sends a data access request, which is intercepted by the policy enforcement point. The policy enforcement point converts the data access request into an XACML authorization request. The policy enforcement point forwards the authorization request to the policy decision point. The policy decision point evaluates the authorization request against policy rules it is configured with and context of the user making the data access request. The policy decision point reaches an enforcement decision to allow access, deny access, or transform SQL and returns the enforcement decision to the policy enforcement point.

When an arbitrary SQL statement (or any other data access framework) attempts to access a random set of data, illustrative embodiments perform a series of steps to arrive at an enforcement decision for data access. Thus, illustrative embodiments cover arbitrary SQL statements, which include open ended projections and joins, table expressions, and other dynamic query enforcement patterns, in a fully dynamic way. This dynamic approach can completely override static data access enforcement without conflicting with enforcement decision output and can essentially stand alone. This is achieved by dynamically constructing the bag of columns enforcement model instance as a static form of access over singleton views, tables, spreadsheets, or any rectangular data with the same pattern that would result in the same enforcement decision with a reduced dimension in the enforcement function. Illustrative embodiments go from function F ("bag of columns stripped from access interface at run time", user, user context) to a repeated pattern of function G ("well-known bag of columns repeated", user, user context), which invokes function F( ) with a unique identifier for a given instance of the bag of columns. This requires illustrative embodiments to generate a unique signature for a given instance of the bag of columns from the column schema, column data classes, or a combination of both that uniquely identify an unordered bag of columns. Hence, this dynamic approach of the bag of columns enforcement model for rectangular data sets of illustrative embodiments is more generalized.

Illustrative embodiments continuously maintain the enforcement knowledge graph, which contains the knowledge of real data sets, virtual information assets that reference the real data sets, column schemas, column data classes, and their relationships including semantics (i.e., terms) of the columns both computationally and manually curated (e.g., assigned). Illustrative embodiments computationally assign or a curator manually assigns terms to the columns based on a glossary of terms used by an organization in a particular domain, such as a business domain, a financial domain, a banking domain, an insurance domain, a healthcare domain, an education domain, or the like. Illustrative embodiments receive a request to access a set of tabular data (i.e., SQL statement) from a client device user having a particular user context. The user context of the client device user may include, for example, user identifier, what set of data was requested by the client device user, when was the access request sent by the client device user (e.g., time of day, day of week, and the like), where was the access request sent from (e.g., geographic origin of the request), what device did the client device user utilize to send the access request (e.g., corporate computer), and the like. It should be noted that the arbitrary SQL statement is in a form that illustrative embodiments can shred and analyze to extract the bag of columns and relations being accessed by the request in the form of a projection and one or more joins should be analyzed.

Illustrative embodiments shred the arbitrary SQL statement at the entry point of the database or virtualization proxy engine and extract table-column pairs {Ti, Cj} corresponding to the requested set of data from a projection and predicate structure of the arbitrary SQL statement. Illustrative embodiments use the projection for column selection and the predicate for row selection in one or more tables. Illustrative embodiments construct column data classes and closures for the table-column pairs {Ti, Cj} from the enforcement knowledge graph. Illustrative embodiments treat closure of a table-column pair as a static information asset that references the requested set of data. In other words, closure in the enforcement knowledge graph is rooted at the node corresponding to the static information asset referencing the requested set of data. In other words, illustrative embodiments traverse edges in the enforcement knowledge graph from particular column nodes to the static information asset referencing the requested set of data. Accordingly, illustrative embodiments process closure by determining data class and other attributes (i.e., terms) at the column level. Illustrative embodiments combine closures on all of the columns that were made separately. Illustrative embodiments join the combined closures with associated policy rules and extract a cumulative enforcement decision. The cumulative enforcement decision is one of allow, deny, or transform.

If the enforcement decision is allow or deny, then illustrative embodiments either allow access or deny access to the requested set of data based on the returned decision. When the enforcement decision is transform, illustrative embodiments rewrite the arbitrary SQL statement based on the associated policy rules and user context so that the user can only access a portion of the requested data set and not the whole data set. Also, some data may be allowed only after data transformation, which includes masking, anonymization, rounding, and other obfuscation methods and transformations.

Thus, illustrative embodiments provide one or more technical solutions that overcome a technical problem with arbitrary tabular data access to rectangular data sets. As a result, these one or more technical solutions provide a technical effect and practical application in the field of data security.

With reference now to FIG. 3, a diagram illustrating an example of an access management system is depicted in accordance with an illustrative embodiment. Access management system 300 may be implemented in a network of data processing systems, such as network data processing system 100 in FIG. 1. Access management system 300 is a system of hardware and software components for dynamically enforcing data protection policies for arbitrary data access to a corpus of one or more rectangular data sets stored in a data lake corresponding to an organization in response to receiving a data access request, such as, for example, a SQL statement, from a client device user.

In this example, access management system 300 includes access management server 302, client device 304, and data lake 306. However, it should be noted that access management system 300 is intended as an example only. In other words, access management system 300 may include any number of access management servers, client devices, data lakes (i.e., storage devices), and other devices not shown.

Access management server 302 may be, for example, server 104 in FIG. 1 or data processing system 200 in FIG. 2. Client device 304 may be, for example, client 110 in FIG. 1. Data lake 306 may be, for example, storage 108 in FIG. 1. Also, it should be noted that server 302, client device 304, and data lake 306 are coupled together via a network, such as, for example, network 102 in FIG. 1.

Data lake 306 stores raw data for an organization. Data lake 306 stores the raw data of the organization in a structured or relational format. For example, data lake 306 stores rectangular data sets 308. Rectangular data sets 308 represent a set of one or more rectangular data sets. Rectangular data sets 308 may include, for example, sets of tables, spreadsheets, and the like.

In this example, access management server 302 includes data profiler 310, business glossary 312, catalog 314, enforcement knowledge graph 316, enforcement decision engine 318, policy database 320, and event backplane 321. Event backplane 321 is an event bus or message queue to provide an event message passing mechanism between the different components of access management server 302.

Data profiler 310 profiles rectangular data sets 308 (i.e., information assets) to generate column-assigned data classes using deep data extraction techniques. In other words, data profiler 310 performs deep semantic (i.e., term) analysis of information contained in rectangular data sets 308 of data lake 306. Data profiler 310 utilizes business glossary 312 to analyze the information. Business glossary 312 is, for example, a hierarchical arrangement of vocabulary or words (i.e., terms), which designate data semantics for columns and information assets as a whole, that are used by the organization corresponding to data lake 306. Data profiler 310 generates nodes 320 and edges 322 in enforcement knowledge graph 312 based on a result of the semantic analysis.

Catalog 312 lists virtual information assets that reference one or more sets of real tabular data in rectangular data sets 308. Catalog 312 is a metadata repository storing all information asset instances structure. A virtual information asset is a stub structure that contains metadata regarding the real data set (i.e., the one or more sets of real tabular data) the virtual information asset points to. Catalog 312 triggers event messages to enforcement knowledge graph 316 on changes to catalog 312.

Enforcement knowledge graph 314 is a hypergraph that contains domain knowledge of the organization for access enforcement decisions. Enforcement knowledge graph 314 is a graph-organized information store where elements are modeled as nodes 322 and edges 324 establishing relationship. Nodes 322 include, for example, information asset nodes, column nodes, user nodes, term nodes, policy nodes, rule nodes, enforcement decision nodes, data class nodes, and the like. Edges 324 represent relationships between nodes. For example, an edge connecting a column node with an information asset node indicates a relationship between those two nodes. An information asset node is a virtual representation of one or more sets of real tabular data in data lake 306. In addition, edges 324 include hyperedges that connect three or more nodes in a relationship.

User 326 utilizes client device 304 to send data access statement and user context 328 to access management server 302. In this example, the data access statement is an arbitrary SQL statement. Access management server 302 utilizes enforcement decision engine 318 to process the received arbitrary SQL statement to make an access enforcement decision. Enforcement decision engine 318 reasons over enforcement knowledge graph 314 to provide a decision for a policy enforcement request after data access statement shredder 330 shreds the received arbitrary SQL statement. Enforcement decision engine 318 may be, for example, enforcement decision engine 218 in FIG. 2.

Enforcement decision engine 318 utilizes data access statement shredder 330 to parse a projection and predicate structure of the received arbitrary SQL statement to identify table-column pairs in a bag of columns corresponding to set of tabular data 348 in rectangular data sets 308. Set of tabular data 348 represents one or more real tabular data sets selected by the received arbitrary SQL statement.

Enforcement decision engine 318 utilizes policy manager 332 to manage and maintain policy database 320. In addition, policy manager 332 defines how data is accessed in data lake 306 using policies 340 and rules 342. A policy guides data access enforcement decisions to achieve intended results. A policy may be, for example, a statement implemented as a procedure or protocol. Each policy in policies 340 contains a set of one or more rules in rules 342. Rules 342 may be, for example, organization rules, government rules, data security regulations, and the like, that govern who can access what data, when, and from where.

Policy enforcement component 334 applies and enforces policies 340 and rules 342 during data access decisions. In this example, policy enforcement component 334 includes policy enforcement point 336 and policy decision point 338. However, it should be noted that although policy enforcement point 336 is illustrated as residing in access management server 302, policy enforcement point 336 may reside in a different system, such as a client.

Policy enforcement point 336 receives data access statement and the user context 328 and extracts, for example, identification of user 326, the context of user 326, identification of the arbitrary SQL statement, identification of data lake 306, identification of the column schema, and the like. Policy enforcement point 336 then passes this extracted information to policy decision point 338 to generate access enforcement decision 344 based on data access enforcement knowledge contained in enforcement knowledge graph 316, the user's context, data requested by the arbitrary SQL statement, one or more applicable policies in policies 340, and a set of associated rules in rules 342. Access enforcement decision 344 is one of allow access to the requested data, deny access to the requested data, or transform the SQL statement to retrieve only a portion of the requested data, such as, for example, without any sensitive or personal information included in the result.

Policy decision point 338 sends access enforcement decision 344 to policy enforcement point 336 to apply the access decision. For example, if access enforcement decision 344 is to allow access, then policy enforcement point 336 permits access to set of tabular data 348, which corresponds to the received arbitrary SQL statement, by client device 304. If access enforcement decision 344 is to deny access, then policy enforcement point 336 prevents access to set of tabular data 348 by client device 304. If access enforcement decision 344 is to transform the arbitrary SQL statement, then data access statement transformation component 346 appropriately transforms the arbitrary SQL statement based on certain policies 340 and rules 342 associated with the received arbitrary SQL statement and user context. As a result, the transformed SQL statement only selects portions of set of tabular data 348 that do not contain, for example, sensitive information, such as social security numbers, credit card numbers, driver license numbers, personal health information, dates of birth, or the like, or transforms the sensitive data, itself, using some obfuscation methods, or other transformations on the data according to the data protection policies.

Figure 4:
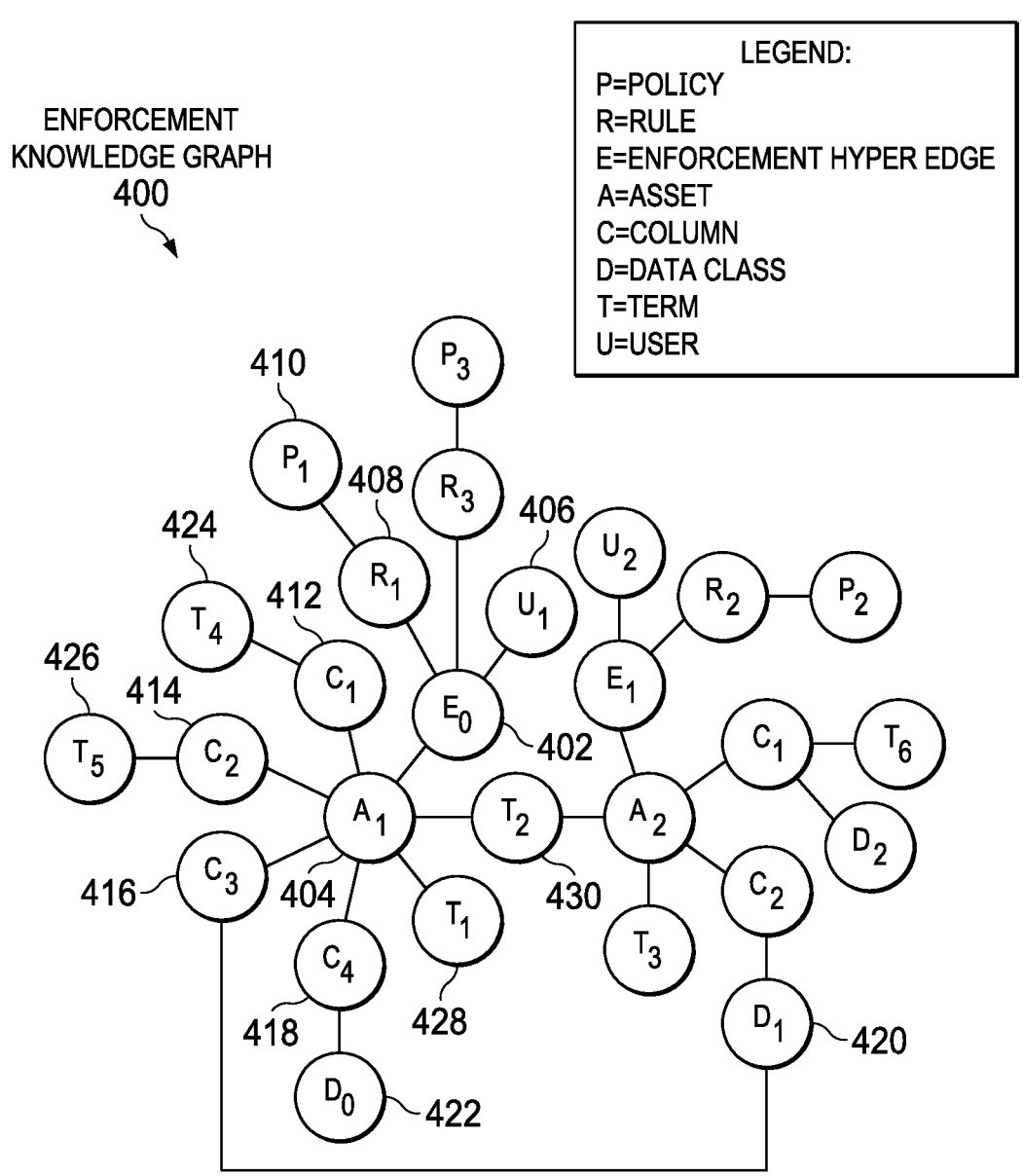
FIG. 4 is a diagram illustrating an example of an enforcement knowledge graph in accordance with an illustrative embodiment.

With reference now to FIG. 4, a diagram illustrating an example of an enforcement knowledge graph is depicted in accordance with an illustrative embodiment. Enforcement knowledge graph 400 may be implemented in a computer, such as, for example, server 104 in FIG. 1, data processing system 200 in FIG. 2, or access management server 302 in FIG. 3. In addition, enforcement knowledge graph 400 may be generated and continuously updated by a data profiler, such as, for example, data profiler 310 in FIG. 3.

Enforcement knowledge graph 400 contains historic enforcement decision knowledge for arbitrary tabular data access to a corpus of rectangular data sets, such as rectangular data sets 308 in FIG. 3. For example, enforcement knowledge graph 400 shows how access enforcement decision node "$E_0$" 402 relates to information asset node "$A_1$" 404, which references a set of real tabular data, such as set of tabular data 348 in FIG. 3, in the rectangular data sets, user node "$U_1$" 406 references the user who submitted the arbitrary SQL statement to access the set of real tabular data, rule node "$R_1$" 408 references the rule that is associated with accessing that particular set of real tabular data, and policy node "$P_1$" 410 references the policy that contains the rule referenced by rule node "$R_1$" 408. Further, enforcement knowledge graph 400 shows how information asset node "$A_1$" 404 relates to column node "$C_1$" 412, column node "$C_2$" 414, column node "$C_3$" 416, and column node "$C_4$" 418 of the rectangular data sets. Enforcement knowledge graph 400 also shows how column node "$C_3$" 416 and column node "$C_4$" 418 relate to data class node "$D_1$" 420 and data class node "$D_0$" 422, respectively. In addition, enforcement knowledge graph 400 shows how column node "$C_1$" 412 and column node "$C_2$" 414 relate to term node "$T_4$" 424 and term node "$T_5$" 426, respectively, and how information asset node "$A_1$" 404 relates to term node "$T_1$" 428 and term node "$T_2$" 430.

Figure 5:
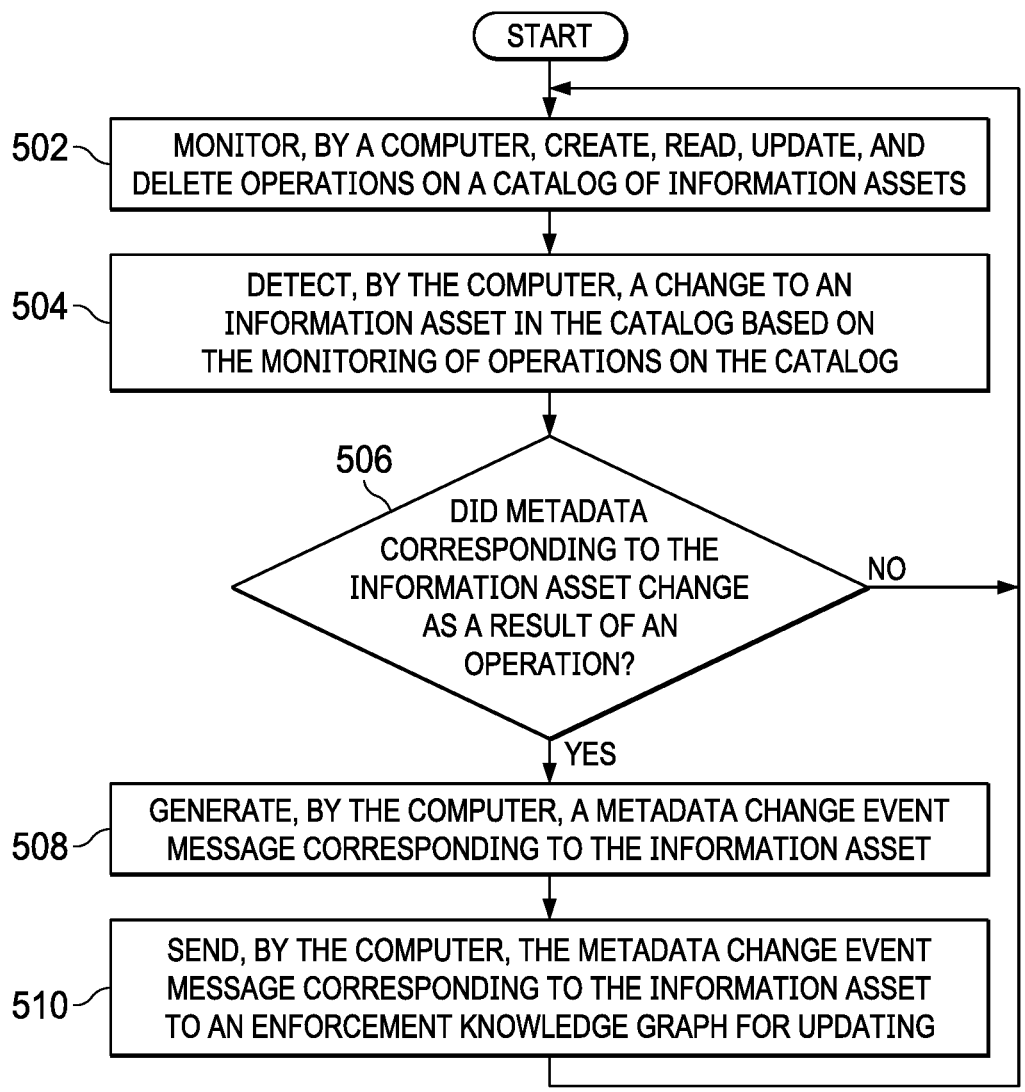
FIG. 5 is a flowchart illustrating a process for detecting changes to a catalog of information assets in accordance with an illustrative embodiment.

With reference now to FIG. 5, a flowchart illustrating a process for detecting changes to a catalog of information assets is shown in accordance with an illustrative embodiment. The process shown in FIG. 5 may be implemented in a computer, such as, for example, server 104 in FIG. 1, data processing system 200 in FIG. 2, or access management server 302 in FIG. 3.

The process begins when the computer monitors create, read, update, and delete operations on a catalog of information assets (step 502). The computer detects a change to an information asset in the catalog based on the monitoring of operations on the catalog (step 504). The computer makes a determination as to whether metadata corresponding to the information asset changed as a result of an operation (step 506).

If the computer determines that the metadata corresponding to the information asset did not change as a result of an operation, no output of step 506, then the process returns to step 502 where the computer continues to monitor operations on the catalog. If the computer determines that the metadata corresponding to the information asset did change as a result of an operation, yes output of step 506, then the computer generates a metadata change event message corresponding to the information asset (step 508). The computer sends the metadata change event message corresponding to the information asset to an enforcement knowledge graph for updating (step 510). Thereafter, the process returns to step 502 where the computer continues to monitor operations on the catalog.

Figure 6:
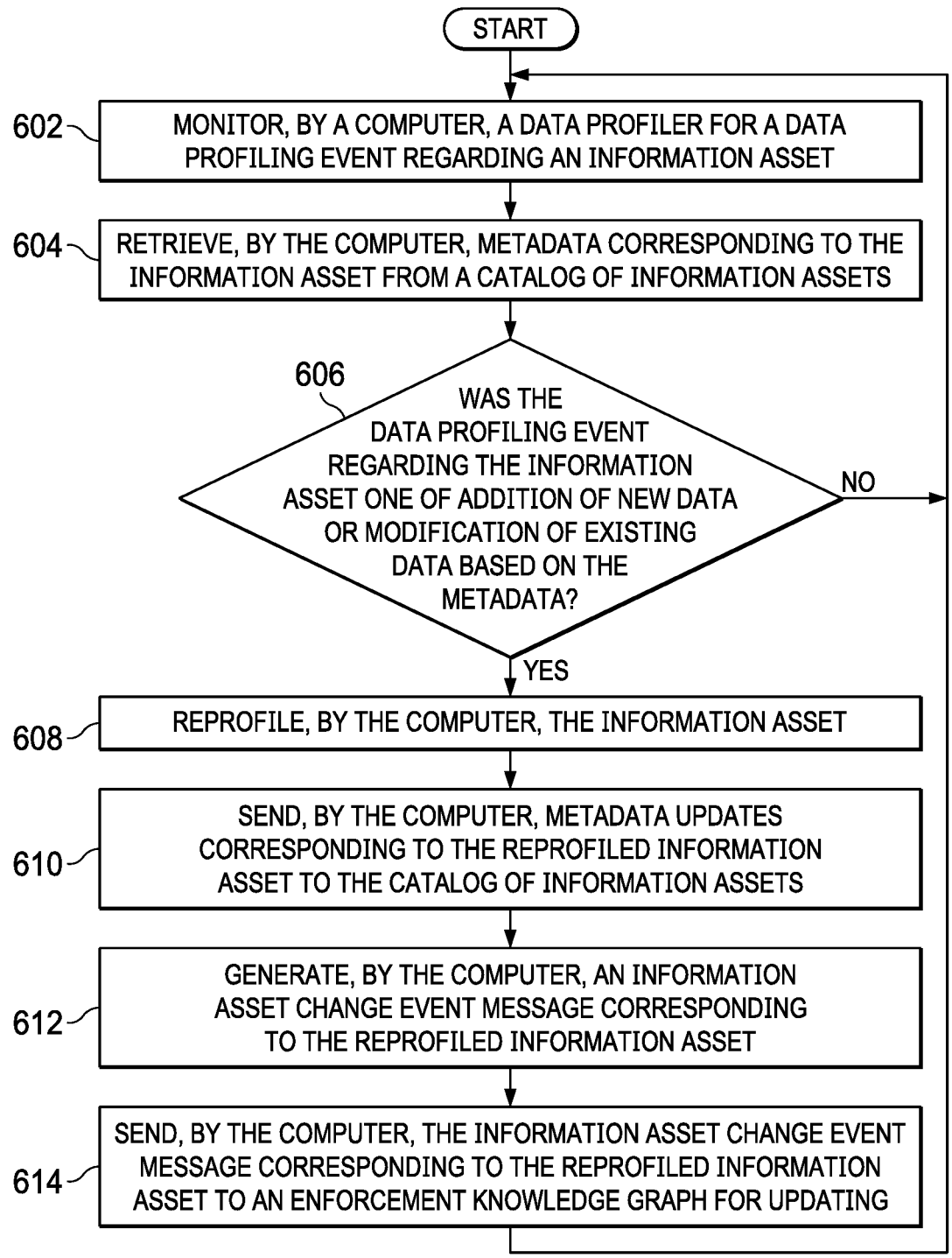
FIG. 6 is a flowchart illustrating a process for updating information assets in a catalog in accordance with an illustrative embodiment.

With reference now to FIG. 6, a flowchart illustrating a process for updating information assets in a catalog is shown in accordance with an illustrative embodiment. The process shown in FIG. 6 may be implemented in a computer, such as, for example, server 104 in FIG. 1, data processing system 200 in FIG. 2, or access management server 302 in FIG. 3.

The process begins when the computer monitors a data profiler for a data profiling event regarding an information asset (step 602). In response to detecting the data profiling event in step 602, the computer retrieves metadata corresponding to the information asset from a catalog of information assets (step 604). The computer makes a determination as to whether the data profiling event regarding the information asset was one of addition of new data or modification of existing data based on the retrieved metadata (step 606).

If the computer determines that the data profiling event regarding the information asset was not one of addition of new data or modification of existing data based on the retrieved metadata, no output of step 606, then the process returns to step 602 where the computer continues to monitor the data profiler for data profiling events. If the computer determines that the data profiling event regarding the information asset was one of addition of new data or modification of existing data based on the retrieved metadata, yes output of step 606, then the computer reprofiles the information asset (step 608). In addition, the computer sends metadata updates corresponding to the reprofiled information asset to the catalog of information assets (step 610).

Further, the computer generates an information asset change event message corresponding to the reprofiled information asset (step 612). The computer sends the information asset change event message corresponding to the reprofiled information asset to an enforcement knowledge graph for updating (step 614). Thereafter, the process returns to step 602 where the computer continues to monitor the data profiler for data profiling events.

Figure 7:
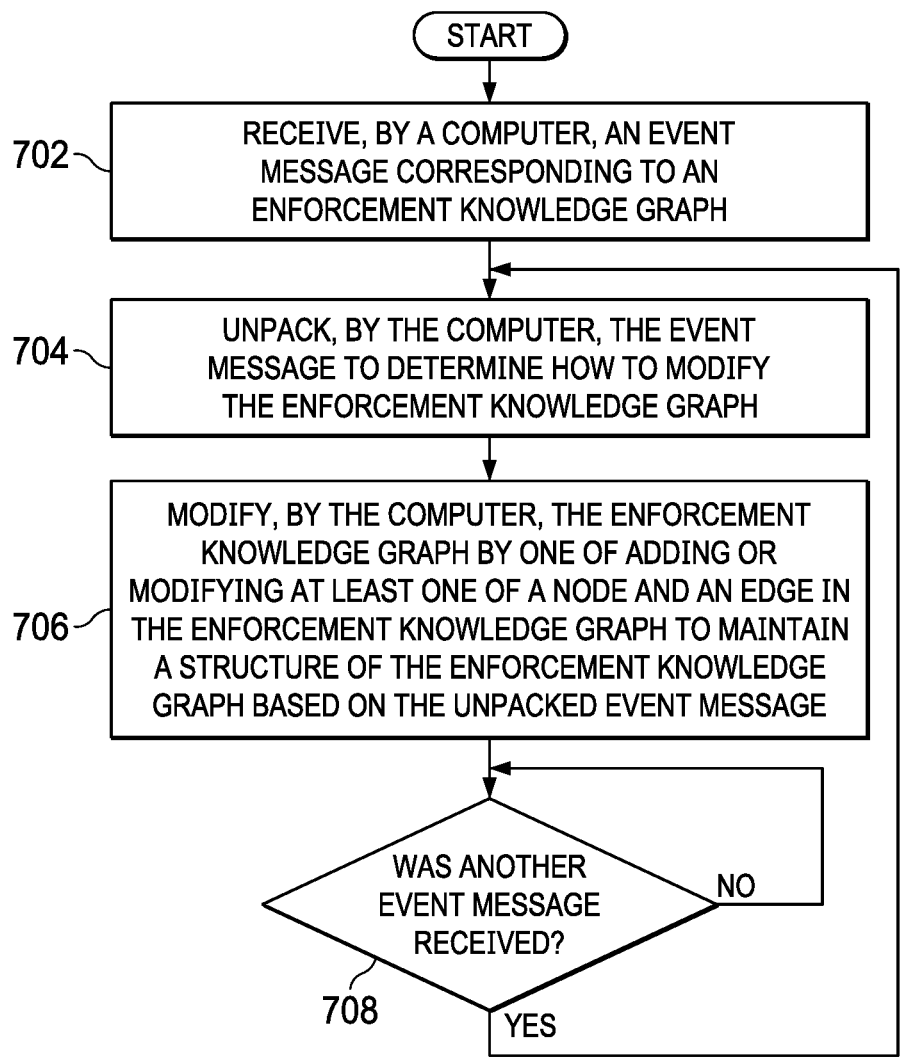
FIG. 7 is a flowchart illustrating a process for updating an enforcement knowledge graph in accordance with an illustrative embodiment.
Figure 8B:
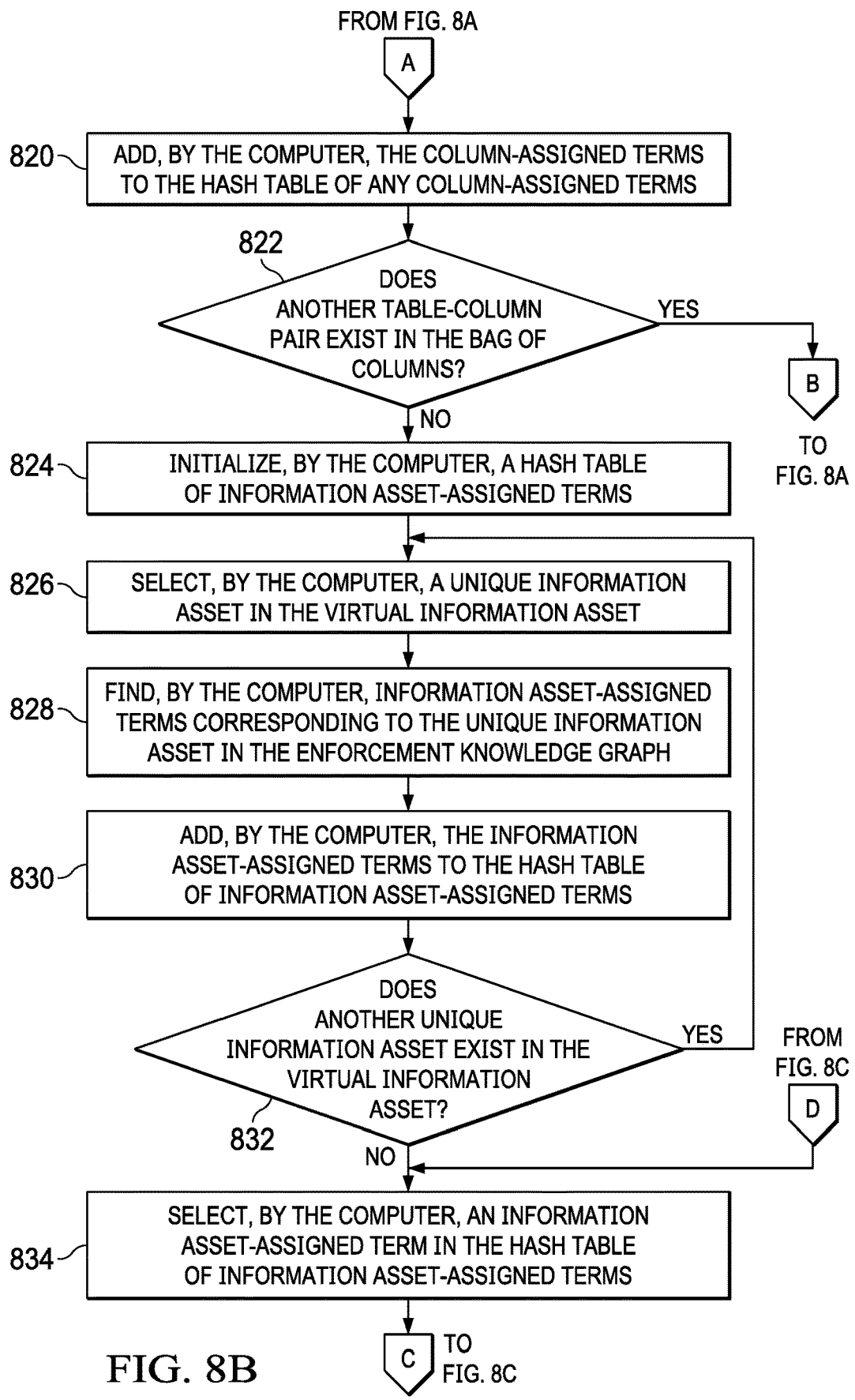
Figure 8C:
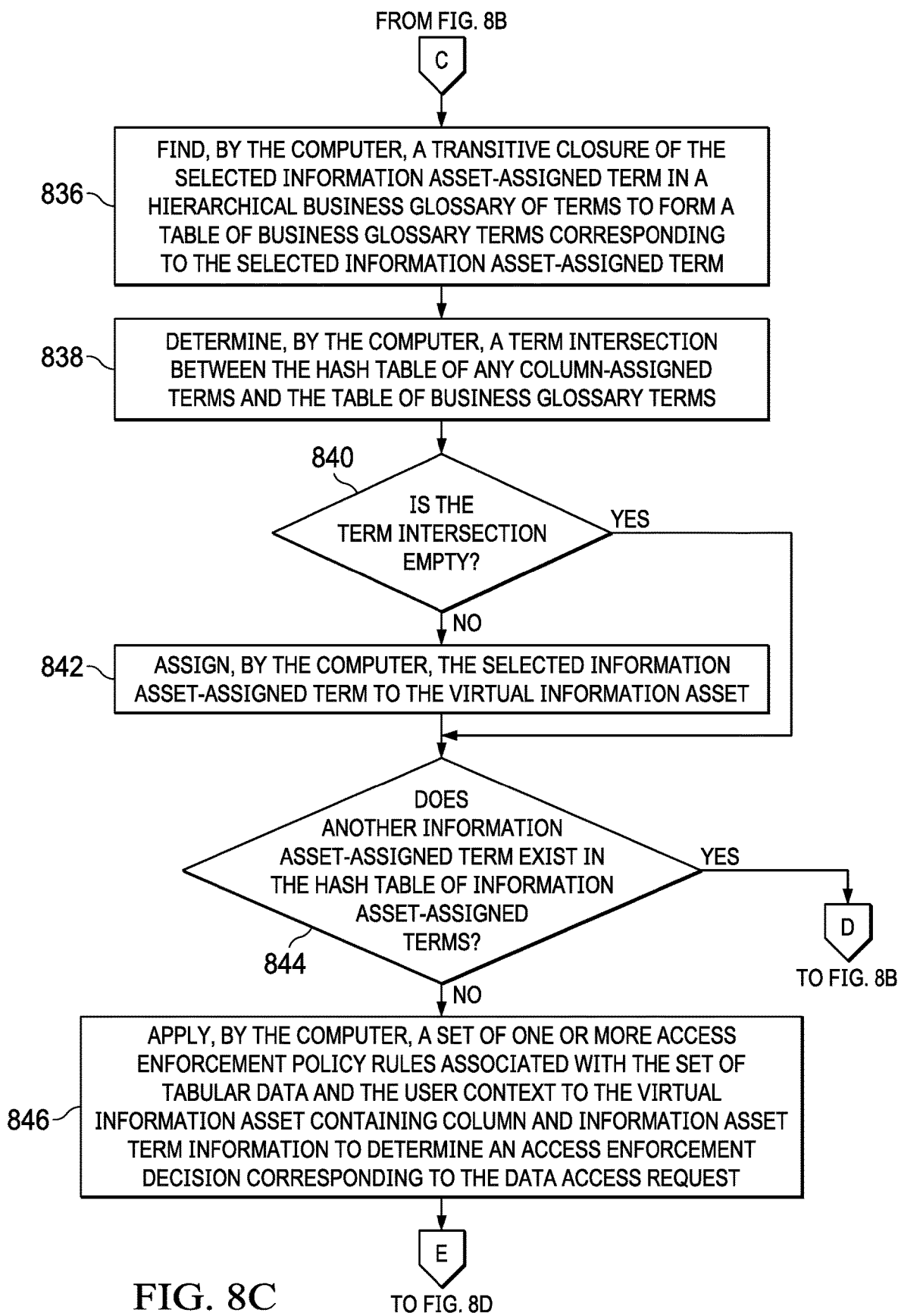
Figure 8D:
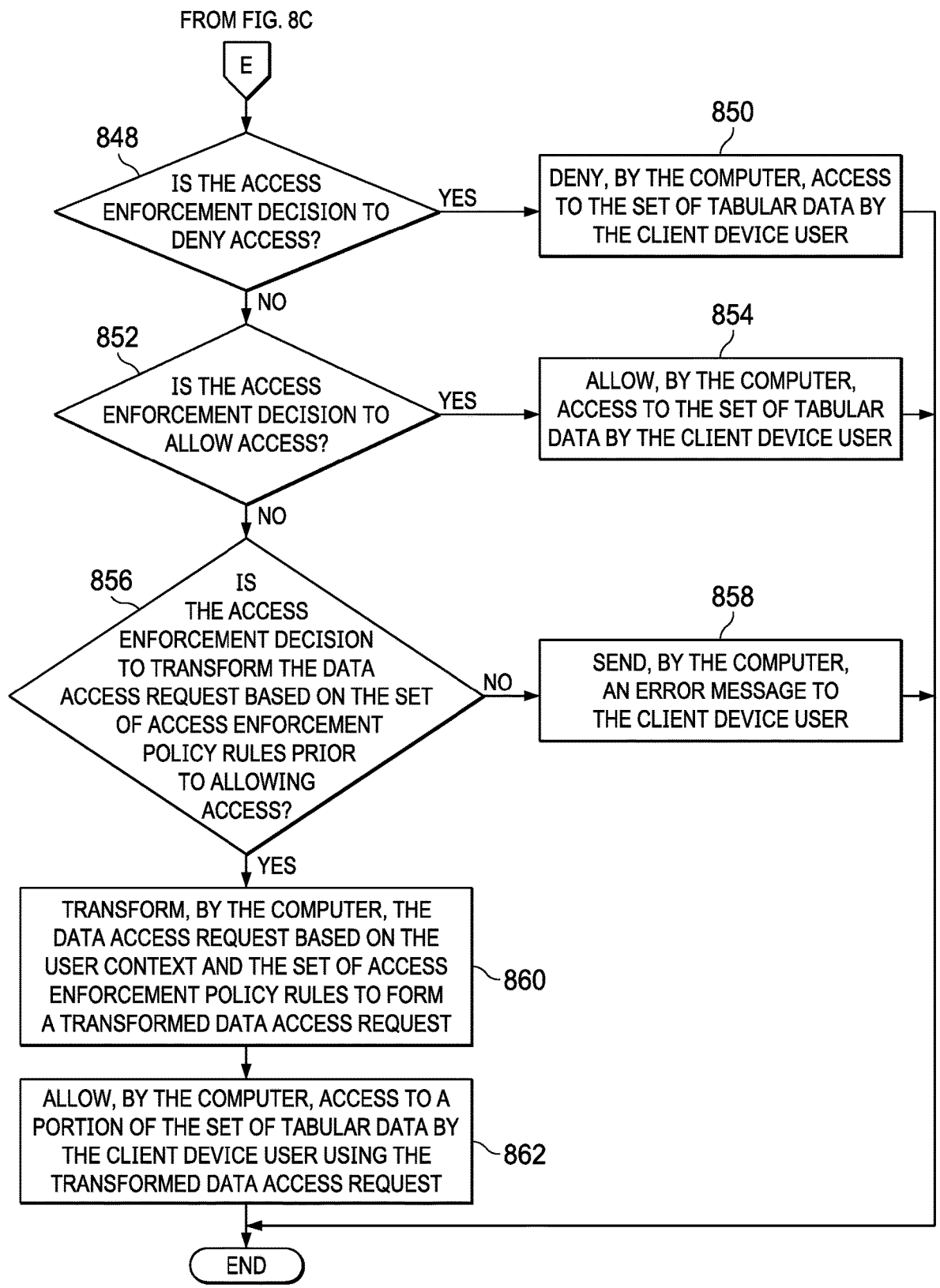

With reference now to FIG. 7, a flowchart illustrating a process for updating an enforcement knowledge graph is shown in accordance with an illustrative embodiment. The process shown in FIG. 7 may be implemented in a computer, such as, for example, server 104 in FIG. 1, data processing system 200 in FIG. 2, or access management server 302 in FIG. 3.

The process begins when the computer receives an event message corresponding to an enforcement knowledge graph (step 702). The computer unpacks the event message to determine how to modify the enforcement knowledge graph (step 704). The computer modifies the enforcement knowledge graph by one of adding or modifying at least one of a node and an edge in the enforcement knowledge graph to maintain a structure of the enforcement knowledge graph based on the unpacked event message (step 706). The computer makes a determination as to whether another event message was received (step 708). If the computer determines that another event message was not received, no output of step 708, then the process returns to step 708 where the computer waits for another event message to be received. If the computer determines that another event message was received, yes output of step 708, then the process returns to step 704 where the computer unpacks the other event message.

With reference now to FIGS. 8A-8D, a flowchart illustrating a process for dynamic enforcement of data protection policies for arbitrary tabular data access is shown in accordance with an illustrative embodiment. The process shown in FIGS. 8A-8D may be implemented in a computer, such as, for example, server 104 in FIG. 1, data processing system 200 in FIG. 2, or access management server 302 in FIG. 3.

The process begins when the computer receives a data access request (e.g., an arbitrary SQL statement) to access a set of tabular data in one or more rectangular data sets having columnar schema from a client device user having a user context (step 802). The computer shreds the data access request to identify table-column pairs in a bag of columns corresponding to the set of tabular data (step 804). In addition, the computer initializes a virtual information asset corresponding to the bag of columns identified by shredding the data access request (step 806). Further, the computer initializes a hash table of any column-assigned terms (step 808).

The computer selects a table-column pair in the bag of columns corresponding to the set of tabular data (step 810). The computer maps a table corresponding to the selected table-column pair to an information asset in a catalog of information assets (step 812). Furthermore, the computer makes a determination as to whether access to the information asset is granted based on the user context (step 814). In other words, when some information assets are denied by the data protection policies based on the user context, this denial can be translated into removal of the denied data while still allowing some other portion of the data, which will be implemented by transformation of the virtual information asset.

If the computer determines that access to the information asset is not granted based on the user context, no output of step 814, then the process returns to step 810 where the computer selects another table-column pair. If the computer determines that access to the information asset is granted based on the user context, yes output of step 814, then the computer navigates to an information asset-column pair of nodes corresponding to the information assets and columns in an enforcement knowledge graph (step 816). The computer transfers column and column node information including disambiguated column name, data class, and column-assigned terms corresponding to the information asset-column pair of nodes to a corresponding virtual column of the virtual information asset (step 818). The computer adds the column-assigned terms to the hash table of any column-assigned terms (step 820).

The computer makes a determination as to whether another table-column pair exists in the bag of columns (step 822). If the computer determines that another table-column pair does exist in the bag of columns, yes output of step 822, then the process returns to step 810 where the computer selects another table-column pair. If the computer determines that another table-column pair does not exist in the bag of columns, no output of step 822, then the computer initializes a hash table of information asset-assigned terms (step 824).

The computer selects a unique information asset in the virtual information asset (step 826). The computer finds information asset-assigned terms corresponding to the unique information asset in the enforcement knowledge graph (step 828). The computer adds the information asset-assigned terms to the hash table of information asset-assigned terms (step 830). The computer makes a determination as to whether another unique information asset exists in the virtual information asset (step 832).

If the computer determines that another unique information asset does exist in the virtual information asset, yes output of step 832, then the process returns to step 826 where the selects another unique information asset. If the computer determines that another unique information asset does not exist in the virtual information asset, no output of step 832, then the computer selects an information asset-assigned term in the hash table of information asset-assigned terms (step 834). The computer also finds a transitive closure of the selected information asset-assigned term in a hierarchical business glossary of terms to form a table of business glossary terms corresponding to the selected information asset-assigned term (step 836). The transitive closure of the selected information asset-assigned term in the hierarchical business glossary of terms may be, for example, a node corresponding to the term, itself, in the hierarchical business glossary or the node corresponding to the term and all leaf node terms. Further, the computer determines a term intersection between the hash table of any column-assigned terms and the table of business glossary terms (step 838). The computer makes a determination as to whether the term intersection is empty (step 840).

If the computer determines that the term intersection is empty, yes output of step 840, then the process proceeds to step 844. If the computer determines that the term intersection is not empty, no output of step 840, then the computer assigns the selected information asset-assigned term to the virtual information asset (step 842). However, it should be noted that the computer in an alternative illustrative embodiment may utilize, for example, a defined common term threshold level, such as 70%, of a Jaccard similarity percentage of common terms before assigning terms to the virtual information asset. In yet another alternative illustrative embodiment, the computer may use machine learning models to compute the association of a random term assignment at the contributing static information asset(s) level to the virtual information asset level. The computer makes a determination as to whether another information asset-assigned term exists in the hash table of information asset-assigned terms (step 844).

If the computer determines that another information asset-assigned term does exist in the hash table of information asset-assigned terms, yes output of step 844, then the process returns to step 834 where the computer selects another information asset-assigned term. If the computer determines that another information asset-assigned term does not exist in the hash table of information asset-assigned terms, no output of step 844, then the computer applies a set of one or more access enforcement policy rules associated with the set of tabular data and the user context to the virtual information asset containing column and information asset term information to determine an access enforcement decision corresponding to the data access request (step 846). It should be noted that the computer may cache the constructed virtual information asset for future reuse to decrease processing.

The computer makes a determination as to whether the access enforcement decision is to deny access (step 848). If the computer determines that the access enforcement decision is to deny access, yes output of step 848, then the computer denies access to the set of tabular data by the client device user (step 850) and the process terminates thereafter. If the computer determines that the access enforcement decision is not to deny access, no output of step 848, then the computer makes a determination as to whether the access enforcement decision is to allow access (step 852). If the computer determines that the access enforcement decision is to allow access, yes output of step 852, then the computer allows access to the set of tabular data by the client device user (step 854) and the process terminates thereafter. If the computer determines that the access enforcement decision is not to allow access, no output of step 852, then the computer makes a determination as to whether the access enforcement decision is to transform the data access request based on the set of access enforcement policy rules prior to allowing access (step 856).

If the computer determines that the access enforcement decision is not to transform the data access request based on the set of access enforcement policy rules prior to allowing access, no output of step 856, then the computer, sends an error message to the client device user (step 858) and the process terminates thereafter. If the computer determines that the access enforcement decision is to transform the data access request based on the set of access enforcement policy rules prior to allowing access, yes output of step 856, then the computer transforms the data access request based on the user context and the set of asset access enforcement policy rules to form a transformed data access request (step 860). The computer allows access to a portion of the set of tabular data by the client device user using the transformed data access request including when some information assets where denied by access enforcement policy rules, this denial translated into removal of denied data while still allowing some other portion of the data, which will be implemented by transformation of the virtual information asset (step 862). Thereafter, the process terminates.

Thus, illustrative embodiments of the present invention provide a computer-implemented method, computer system, and computer program product for dynamically enforcing data protection policies for arbitrary tabular data access to a corpus of rectangular data sets having columnar schema. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamic enforcement of data protection policies for arbitrary tabular data access as a collection of columns over a plurality of different information assets having different columnar schema, the computer-implemented method comprising:
    finding, by a computer, in an enforcement knowledge graph, information asset-assigned terms corresponding to each unique information asset in a virtual information asset that references a set of tabular data in one or more rectangular data sets having columnar schema;
    adding, by the computer, the information asset-assigned terms to a hash table of information asset-assigned terms;
    finding, by the computer, transitive closures of the information asset-assigned terms in a hierarchical business glossary of terms to form a table of business glossary terms corresponding to each information asset-assigned term;
    determining, by the computer, term intersection between a hash table of any column-assigned terms and the table of business glossary terms;
    assigning, by the computer, the information asset-assigned terms to the virtual information asset in response to determining that the term intersection is not empty; and
    applying, by the computer, a set of access enforcement policy rules associated with the set of tabular data and a particular user context of a client device user making a data access request to the set of tabular data to the virtual information asset containing column and information asset term information to determine an access enforcement decision corresponding to the data access request.

2. The computer-implemented method of claim 1 further comprising:

receiving, by the computer, the data access request to access the set of tabular data in the one or more rectangular data sets having the columnar schema from the client device user having the particular user context, wherein the particular user context of the client device user includes a user identifier, what set of tabular data was being requested by the client device user, when was the data access request sent by the client device user, where was the data access request sent from, and what device did the client device user utilize to send the data access request; and shredding, by the computer, the data access request to identify table-column pairs in a bag of columns corresponding to the set of tabular data, wherein the data access request defines arbitrary projections and joins of the set of tabular data requested by the client device user within the one or more rectangular data sets having the columnar schema.

3. The computer-implemented method of claim 2 further comprising:

selecting, by the computer, a table-column pair in the bag of columns corresponding to the set of tabular data; and mapping, by the computer, a table corresponding to the table-column pair to an information asset in a catalog of information assets.

4. The computer-implemented method of claim 3 further comprising:

navigating, by the computer, to an information asset-column pair of nodes corresponding to the information asset in the enforcement knowledge graph;

transferring, by the computer, column and column node information including disambiguated column name, data class, and column-assigned terms corresponding to the information asset-column pair of nodes to a corresponding virtual column of the virtual information asset; and adding, by the computer, the column-assigned terms to the hash table of any column-assigned terms.

5. The computer-implemented method of claim 1 further comprising:

determining, by the computer, whether the access enforcement decision is to transform the data access request based on the set of access enforcement policy rules prior to allowing access;

responsive to the computer determining that the access enforcement decision is to transform the data access request based on the set of access enforcement policy rules prior to allowing access, transforming, by the computer, the data access request based on the particular user context and the set of access enforcement policy rules to form a transformed data access request; and allowing, by the computer, access to a portion of the set of tabular data by the client device user using the transformed data access request including when some information assets where denied by access enforcement policy rules, this denial translated into removal of denied data while still allowing some other portion of the data, which will be implemented by transformation of the virtual information asset.

6. The computer-implemented method of claim 1 further comprising:

determining, by the computer, whether the access enforcement decision is to allow access to the set of tabular data requested by the client device user; and responsive to the computer determining that the access enforcement decision is to allow access to the set of tabular data requested by the client device user, allowing, by the computer, access to the set of tabular data by the client device user.

7. The computer-implemented method of claim 1 further comprising:

determining, by the computer, whether the access enforcement decision is to deny access to the set of tabular data requested by the client device user; and responsive to the computer determining that the access enforcement decision is to deny access to the set of tabular data requested by the client device user, denying, by the computer, access to the set of tabular data by the client device user.

8. The computer-implemented method of claim 1, wherein the enforcement knowledge graph captures term knowledge, column schema knowledge, historic user access patterns, and associated enforcement decisions corresponding to the set of tabular data requested by the client device user.

9. The computer-implemented method of claim 1, wherein the term intersection between the hash table of any column-assigned terms and the table of business glossary terms is a Jaccard similarity percentage of common terms greater than a defined common term threshold level.

10. A computer system for dynamic enforcement of data protection policies for arbitrary tabular data access as a collection of columns over a plurality of different information assets having different columnar schema, the computer system comprising:

a bus system;

a storage device connected to the bus system, wherein the storage device stores program instructions; and a processor connected to the bus system, wherein the processor executes the program instructions to:

find, in an enforcement knowledge graph, information asset-assigned terms corresponding to each unique information asset in a virtual information asset that references a set of tabular data in one or more rectangular data sets having columnar schema;

add the information asset-assigned terms to a hash table of information asset-assigned terms;

find transitive closures of the information asset-assigned terms in a hierarchical business glossary of terms to form a table of business glossary terms corresponding to each information asset-assigned term;

determine term intersection between a hash table of any column-assigned terms and the table of business glossary terms;

assign the information asset-assigned terms to the virtual information asset in response to determining that the term intersection is not empty; and apply a set of access enforcement policy rules associated with the set of tabular data and a particular user context of a client device user making a data access request to the set of tabular data to the virtual information asset containing column and information asset term information to determine an access enforcement decision corresponding to the data access request.

11. The computer system of claim 10, wherein the processor further executes the program instructions to:

receive the data access request to access the set of tabular data in the one or more rectangular data sets having the columnar schema from the client device user having the particular user context, wherein the particular user context of the client device user includes a user identifier, what set of tabular data was being requested by the client device user, when was the data access request sent by the client device user, where was the data access request sent from, and what device did the client device user utilize to send the data access request; and shred the data access request to identify table-column pairs in a bag of columns corresponding to the set of tabular data, wherein the data access request defines arbitrary projections and joins of the set of tabular data requested by the client device user within the one or more rectangular data sets having the columnar schema.

12. The computer system of claim 11, wherein the processor further executes the program instructions to:

select a table-column pair in the bag of columns corresponding to the set of tabular data; and map a table corresponding to the table-column pair to an information asset in a catalog of information assets.

13. The computer system of claim 12, wherein the processor further executes the program instructions to:

navigate to an information asset-column pair of nodes corresponding to the information asset in the enforcement knowledge graph;

transfer column and column node information including disambiguated column name, data class, and column-assigned terms corresponding to the information asset-column pair of nodes to a corresponding virtual column of the virtual information asset; and add the column-assigned terms to the hash table of any column-assigned terms.

14. The computer system of claim 10, wherein the processor further executes the program instructions to:

determine whether the access enforcement decision is to transform the data access request based on the set of access enforcement policy rules prior to allowing access;

transform the data access request based on the particular user context and the set of access enforcement policy rules to form a transformed data access request in response to determining that the access enforcement decision is to transform the data access request based on the set of access enforcement policy rules prior to allowing access; and allow access to a portion of the set of tabular data by the client device user using the transformed data access request including when some information assets where denied by access enforcement policy rules, this denial translated into removal of denied data while still allowing some other portion of the data, which will be implemented by transformation of the virtual information asset.

15. A computer program product for dynamic enforcement of data protection policies for arbitrary tabular data access as a collection of columns over a plurality of different information assets having different columnar schema, the computer program product comprising a non-transitory computer readable storage medium having program instructions embodied therewith, the program instructions executable by a computer to cause the computer to perform a method comprising:

finding, by the computer, in an enforcement knowledge graph, information asset-assigned terms corresponding to each unique information asset in a virtual information asset that references a set of tabular data in one or more rectangular data sets having columnar schema;

adding, by the computer, the information asset-assigned terms to a hash table of information asset-assigned terms;

finding, by the computer, transitive closures of the information asset-assigned terms in a hierarchical business glossary of terms to form a table of business glossary terms corresponding to each information asset-assigned term;

determining, by the computer, term intersection between a hash table of any column-assigned terms and the table of business glossary terms;

assigning, by the computer, the information asset-assigned terms to the virtual information asset in response to determining that the term intersection is not empty; and applying, by the computer, a set of access enforcement policy rules associated with the set of tabular data and a particular user context of a client device user making a data access request to the set of tabular data to the virtual information asset containing column and information asset term information to determine an access enforcement decision corresponding to the data access request.

16. The computer program product of claim 15 further comprising:

receiving, by the computer, the data access request to access the set of tabular data in the one or more rectangular data sets having the columnar schema from the client device user having the particular user context, wherein the particular user context of the client device user includes a user identifier, what set of tabular data was being requested by the client device user, when was the data access request sent by the client device user, where was the data access request sent from, and what device did the client device user utilize to send the data access request; and shredding, by the computer, the data access request to identify table-column pairs in a bag of columns corresponding to the set of tabular data, wherein the data access request defines arbitrary projections and joins of the set of tabular data requested by the client device user within the one or more rectangular data sets having the columnar schema.

17. The computer program product of claim 16 further comprising:

selecting, by the computer, a table-column pair in the bag of columns corresponding to the set of tabular data; and mapping, by the computer, a table corresponding to the table-column pair to an information asset in a catalog of information assets.

18. The computer program product of claim 17 further comprising:

navigating, by the computer, to an information asset-column pair of nodes corresponding to the information asset in the enforcement knowledge graph;

transferring, by the computer, column and column node information including disambiguated column name, data class, and column-assigned terms corresponding to the information asset-column pair of nodes to a corresponding virtual column of the virtual information asset; and adding, by the computer, the column-assigned terms to the hash table of any column-assigned terms.

19. The computer program product of claim 15 further comprising:

determining, by the computer, whether the access enforcement decision is to transform the data access request based on the set of access enforcement policy rules prior to allowing access;

responsive to the computer determining that the access enforcement decision is to transform the data access request based on the set of access enforcement policy rules prior to allowing access, transforming, by the computer, the data access request based on the particular user context and the set of access enforcement policy rules to form a transformed data access request; and allowing, by the computer, access to a portion of the set of tabular data by the client device user using the transformed data access request including when some information assets where denied by access enforcement policy rules, this denial translated into removal of denied data while still allowing some other portion of the data, which will be implemented by transformation of the virtual information asset.

20. The computer program product of claim 15, wherein the enforcement knowledge graph captures term knowledge, column schema knowledge, historic user access patterns, and associated enforcement decisions corresponding to the set of tabular data requested by the client device user.

* * * * *